United States Patent
Calvanella

[19]

[11] Patent Number: 6,165,589
[45] Date of Patent: Dec. 26, 2000

[54] PROCESS FOR MANUFACTURING SHEETS AND SURFACES OF ARTICLES WITH A DECORATION OF LENTICULAR DOTS OR SMALL GLASS CYLINDERS, EQUIPMENT AND PRODUCT

[76] Inventor: Marco Calvanella, Via Gaiche, 24, 06066 Piegaro, Italy

[21] Appl. No.: 09/008,870

[22] Filed: Jan. 20, 1998

[30] Foreign Application Priority Data

Feb. 14, 1997 [IT] Italy .................................. MI97A0316

[51] Int. Cl.⁷ ..................................................... B32B 17/00
[52] U.S. Cl. .......................... 428/149; 428/325; 428/428; 427/199; 427/282; 65/36
[58] Field of Search ..................................... 428/149, 325, 428/428; 427/199, 282; 65/36

[56] References Cited

U.S. PATENT DOCUMENTS

| | | |
|---|---|---|
| 293,636 | 2/1884 | De Festetics ........................... 427/199 |
| 669,381 | 3/1901 | Buttler ..................................... 428/144 |
| 1,001,013 | 8/1911 | Franz ....................................... 428/149 |
| 1,531,613 | 3/1925 | Hommel ................................... 427/199 |
| 1,570,368 | 1/1926 | Zeh .......................................... 427/199 |
| 1,580,921 | 4/1926 | Scherer .................................... 427/199 |
| 1,998,053 | 4/1935 | McBurney et al. ..................... 427/199 |
| 4,542,958 | 9/1985 | Young ...................................... 350/167 |

*Primary Examiner*—William P. Watkins, III
*Attorney, Agent, or Firm*—Sheridan Ross P.C.

[57] ABSTRACT

Glass elements, particularly small cylinders of Venetian-type glass, are arranged on a basic sheet or flat surface (10) by means of a grid tool (20) and possibly a masking implement (30) or a plurality of masking implements, to selectively mask part of the holes in the grid. The sheet of glass with small cylinders resting on it is then subjected to heating, at temperatures between 400 and 1100 ° C. Sheets or articles are provided with lenticular drops or small cylinders in one or more colors that can be used for ornamental purposes and interior decoration are obtained.

14 Claims, 2 Drawing Sheets

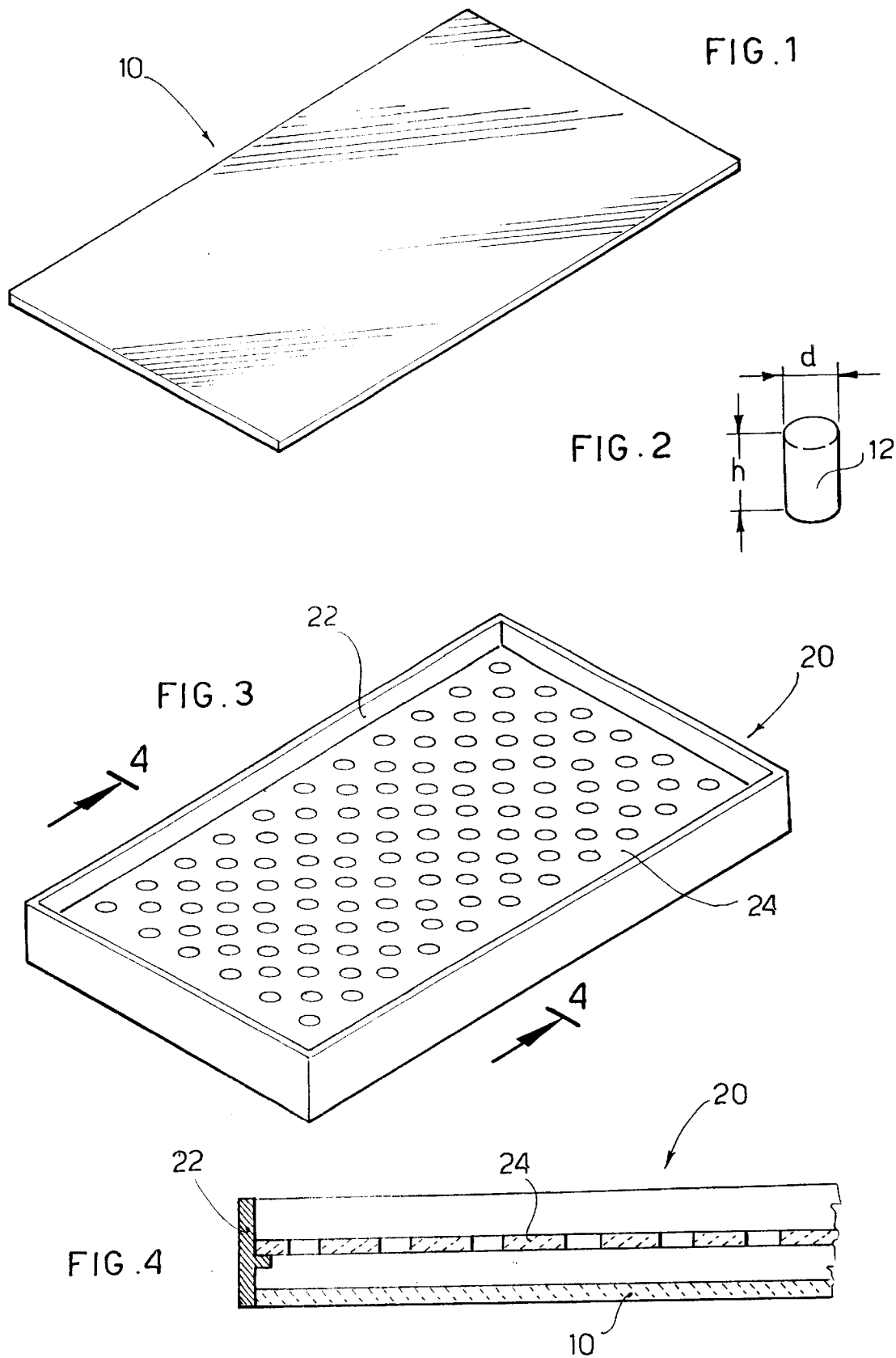

PROCESS FOR MANUFACTURING SHEETS AND SURFACES OF ARTICLES WITH A DECORATION OF LENTICULAR DOTS OR SMALL GLASS CYLINDERS, EQUIPMENT AND PRODUCT

BRIEF SUMMARY OF THE INVENTION

An object of the present invention is to obtain a new product for ornamental use and interior decoration, in a practical and rapid manner that can be applied industrially.

The subject matter of the invention is defined in its essential characteristics in claims 1, 9 and 10. The further claims refer to new and useful accessory characteristics.

The new product is a glass sheet or glass article provided with hemispherical or cylindrical glass lenticular elements, generally colored, applied to at least one face.

A process for obtaining this product comprises the steps of obtaining, generally from cylindrical glass bars, preferably of so-called Venetian glass, a quantity of relatively small glass elements or beads, generally cylindrical in shape, the height of each cylinder preferably being greater than the diameter thereof; disposing a grid implement on the plate; possibly disposing on this grid implement a first masking implement to partly close the openings in the grid, pouring a first series of glass beads of a first color onto the partially closed grid so that by passing through the uncovered openings of the grid they can arrange themselves on the glass plate beneath, preferably resting with a base of their cylindrical shape; possibly changing the masking on the grid, pouring a second series of beads through the holes in the grid, thus left uncovered, so as to obtain a second arrangement of beads on the grid; possibly repeating the operations for a third series of elements or beads; and then subjecting the sheet to heating with the glass elements or beads on top to a softening temperature, particularly between 400 and 1100° C. depending upon the chemical composition of the glass used.

The new process makes it possible to obtain decorative plates in a relatively economical manner that is easy to accomplish.

BRIEF DESCRIPTION OF SEVERAL VIEWS OF THE DRAWINGS

An exemplary unrestrictive embodiment of the invention will be described below with reference to the annexed drawings wherein:

FIG. 1 is a perspective view of a base glass sheet or plate used in the process;

FIG. 2 in an enlarged perspective view of a glass cylinder or bead element used in the process;

FIG. 3 is a perspective view of a grid element used for the process, on a reduced scale;

FIG. 4 is a vertical sectional view of the grid implement applied to the glass plate, taken along plane 4—4 in FIG. 3;

DETAILED DESCRIPTION OF THE INVENTION

Figure 5:
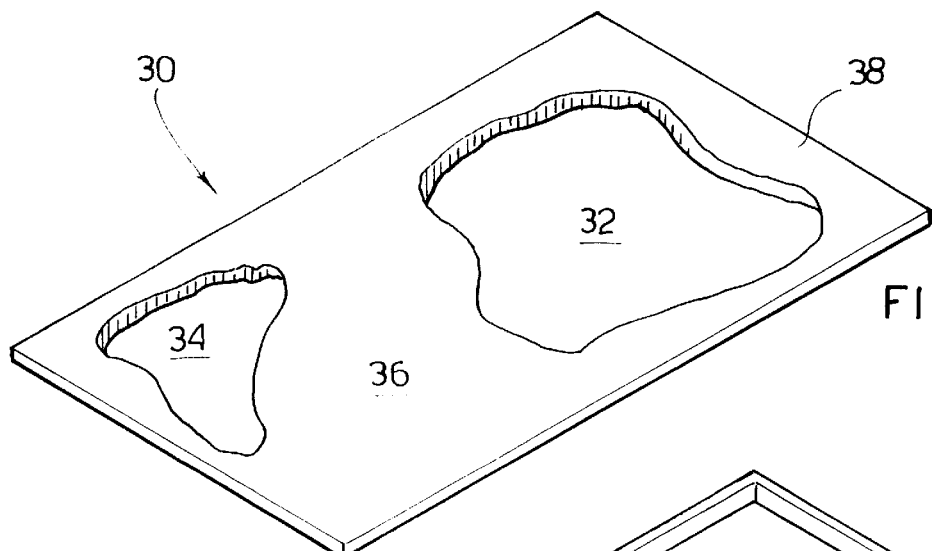
FIG. 5 is a perspective view of a masking implement for use together with the grid in FIG. 3.

FIG. 1 shows a glass sheet or plate 10 that can be used for the process of the present invention; the glass can be transparent, translucent or opaque; however, it will preferably be transparent.

In addition glass elements or beads 12, preferably in the form of cylinders as shown, enlarged, in FIG. 2 are also used. They are obtained, according to the invention, by cutting glass rods preferably of a type known in the field as "Venetian rods" or "Canne di Murano". A plurality of such elements 12 are preferably used, of different colors or possibly even colorless. The height measurement, h, of each small cylinder is preferably greater than the diameter, d, thereof.

FIG. 3 shows a grid implement 20' used in the process, which comprises a frame 22 enclosing a perforated plate 24 generally made of plastic material, preferably PVC.

The holes in the plate can be arranged in any manner, regular or irregular, each hole preferably having a diameter that is larger than the diameter of the elements 12 used but smaller than the height h thereof.

FIG. 5 shows a masking implement, referenced 30, generally consisting of a sheet with similar measurements to those of the sheet 24 and having open areas 32, 34 and closed areas or lands 36, 38. The masking implement or plate is generally of rigid plastic or metal material with the smallest possible thickness. When it is superimposed in register on the perforated grid 20, the passage through the holes that come to coincide with the areas 32, 34 is left free, whereas the holes that come to coincide with the areas 36, 38 are covered.

FIG. 5 shows the grid 20 on which the masking plate 30 has been applied.

The manufacturing process will now be briefly described.

The perforated grid 20 is superimposed on the glass sheet 10 and they are temporarily fixed in register to each other (FIG. 4).

Figure 6:
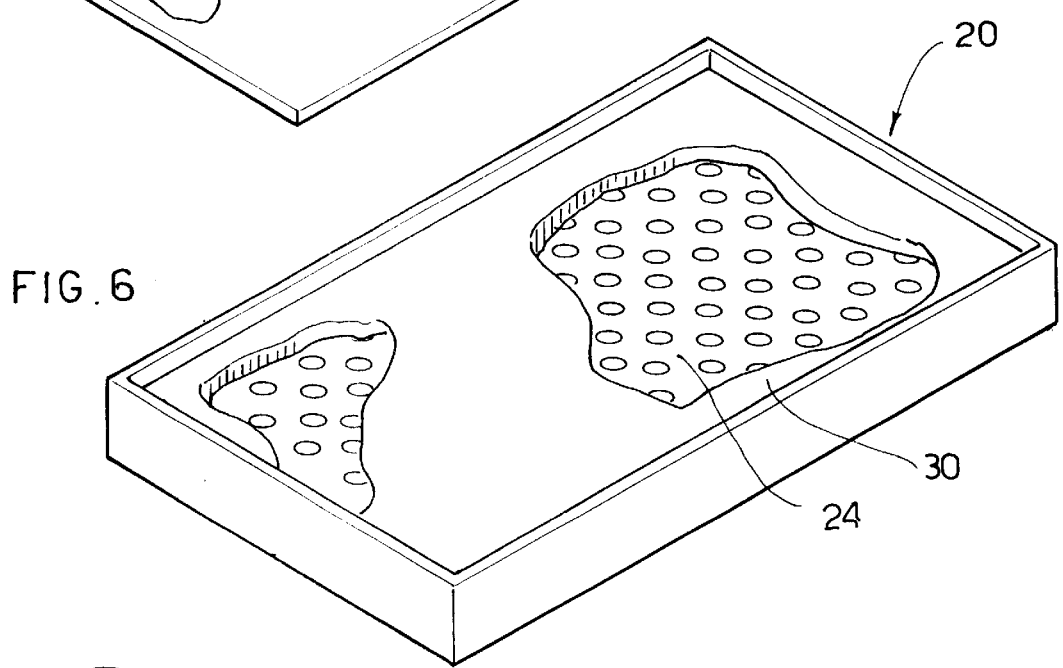
FIG. 6 shows the grid of FIG. 3 combined with the masking frame or implement of FIG. 5.

A masking plate or implement 30 is superimposed on the perforated grid as in FIG. 6. The glass beads or cylinders 12, colored for example in a first color, are then poured onto the mask in a much larger number than the number of holes left uncovered by the masking implement. The beads are forced to pass through the uncovered holes either by tilting the mask or in any case moving the grains on the masking implement so that they fall into the uncovered holes; they always fall with one of the bases toward the bottom consisting of the surface of the glass sheet to be decorated.

This continues until every uncovered hole has been filled by the respective bead.

When the operation is completed, the excess beads are removed. The sheet 10 thus provided with beads 12 simply resting thereon can be subjected to firing, for example in an oven, to fix the beads. A suitable firing temperature is between 400° and 1100° C. for instance.

Alternatively, after removal of the first masking implement, a second masking implement with different open areas from the open areas, of the first masking implement and with blocked areas different from the closed areas of the first implement, can be applied, and glass elements 12, for example in a second color, can then be poured, and will fill the holes left free by the first masking implement.

This operation can be repeated with various masking implements and various groups of glass beads of various colors.

Figure 8:
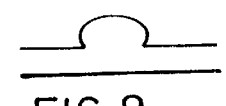
FIGS. 8, 9 and 10 each show an enlarged broken off sectional view of a finished product taken through an applied bead.
Figure 7:
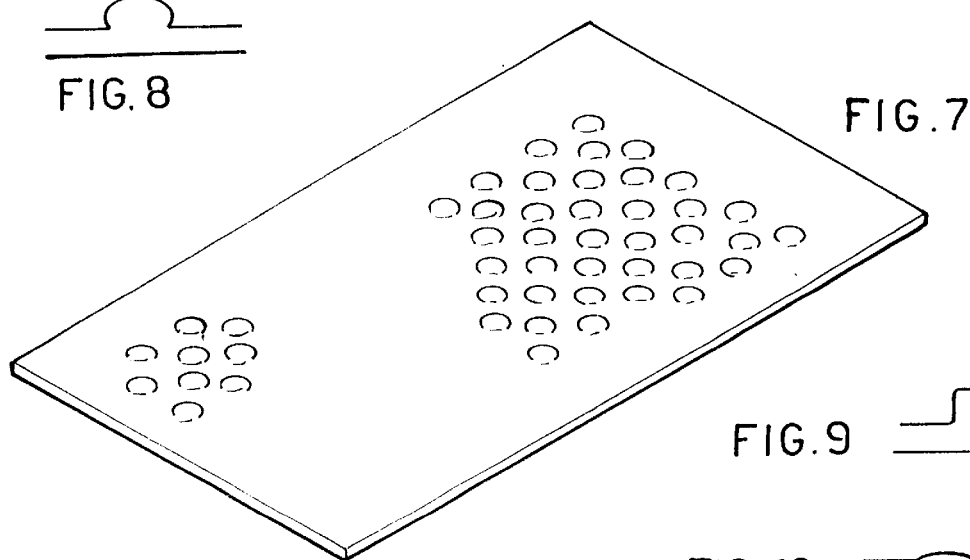
FIG. 7 shows a finished product in a perspective view.

After removal of the last masking implement and the perforated grid, the glass sheet is subjected to heating to fix the glass beads. In the event of "incompatibility" between the basic surface and the glass beads these take on a lenticular shape and are fixed to the glass sheet as can be seen in the enlarged section in FIG. 8, in which materials with different coefficients of expansion ("incompatible" materials) have been used for the sheet and the glass beads, thus causing a fracture at the line of contact thereof.

The glass bead will thus induce a very stable and regular circular fracture in the sheet which will not spread; the fracture will not be complete, always sparing a part of the plate at the deepest point. The fracture acts as a reflecting surface, which gives a strong sparkle to the colored glass bead.

Figure 9:
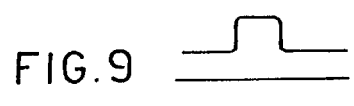
Figure 10:
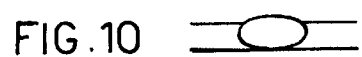

In the case of "compatible" materials (i.e. materials having a same coefficient of expansion or dilatation) for the supporting surface and the decoration, the behaviour of the whole when subjected to firing can vary, with increasing temperature, from simple welding without substantial loss of shape of the beads (FIG. 9) to complete incorporation (FIG. 10) into the basic surface without any fracture.

It should be noted that although the invention has been explained generally referring to a "sheet", application of the lenticular dots or beads can be done on surfaces of bodies of different shapes, flat or otherwise. Further, a sheet can be bent after application of the glass beads.

The foregoing description of the present invention has been presented for purposes of illustration and description. Furthermore, the description is intended to limit the invention to the form disclosed herein. Consequently, variations and modifications commensurate with the above teachings, in the skill or knowledge of the relevant art, or within the scope of the present invention. The embodiments described hereinabove are further intended to explain best modes for practicing the invention and to enable others skilled in the art to utilize the invention in such, or other, embodiments and with various modifications required by the particular applications or uses of the present invention. It is intended that the appended claims to be construed to include alternative embodiments to the extent permitted by the prior art.

What is claimed is:

1. An article obtained with the process of:
   placing a grid implement with holes over a glass substrate;
   passing glass beads through the holes in the grid implement to permit the glass beads to contact the glass substrate;
   removing the grid implement from the glass substrate; and
   subjecting the glass substrate with the beads thereon to heating to a temperature sufficient to soften at least one of the glass substrate and beads, wherein the glass beads and glass substrate have differing coefficients of expansion and are therefore incompatible and wherein, after the subjecting step, a fracture exists at the junctions of a plurality of the glass beads and the glass substrate.

2. A glass article comprising one or more applications of objects having at least one of a lenticular or cylindrical shape fused to at least a portion of a surface of a glass substrate, wherein the objects have a first coefficient of expansion and the substrate a second coefficient of expansion, the first and second coefficients of expansion are different, and a fracture is located at junctions of a plurality of the objects and the substrate as a result of the differing first and second coefficients of expansion.

3. The article of claim 1, wherein the beads have a substantially cylindrical shape or a lenticular shape.

4. The article of claim 3, wherein the process further includes the step of:
   disposing on the grid implement a masking implement with open and closed areas, so as to leave the holes of the grid implement that coincide with the open areas of the masking implement free for passage of beads while leaving the holes of the grid implement that coincide with the closed areas of the masking implement blocked to the passage of beads.

5. The article of claim 4, wherein the beads in the passing step are of a first type and further including the step of removing the masking implement and applying a second masking implement with spatially different open and closed areas from those of the masking implement and thereafter passing beads of a second type different from the beads of the first type through the holes of the grid implement left uncovered by the second masking implement so as to obtain on the grid implement an arrangement of beads of the second type that is different from the arrangement of beads of the first type.

6. The article of claim 5, further including the step of applying a third masking implement to the glass substrate to form an arrangement of beads of a third type that is different from the beads of the first and second types.

7. The article of claim 1, wherein the glass beads are cylindrical in shape and in the subjecting step the flat bases of the cylindrically shaped glass beads rest on the glass substrate.

8. The article of claim 1, wherein in the subjecting step the glass beads are fused to the glass substrate.

9. The article of claim 1, wherein the glass beads are formed from Venetian rods.

10. The article of claim 1, wherein the temperature in the subjecting step ranges from about 400 to about 1100° C.

11. The article of claim 2, wherein the objects are formed from Venetian glass rods.

12. The article of claim 2, wherein the objects are formed from cylindrical beads and wherein the flat base of the beads rested on the substrate before the beads were subjected to heating.

13. The article of claim 2, wherein the objects have different colors.

14. The article of claim 1, wherein the shapes of the glass beads change during the subjecting step.

* * * * *